UNITED STATES PATENT OFFICE 2,627,516

ACTIVATION AND ESTERIFICATION OF AMYLACEOUS POLYSACCHARIDES

Rolland L. Lohmar, Jr., Peoria, Ill., assignor to the United States of America as represented by the Secretary of Agriculture No Drawing. Application November 22, 1949
Serial No. 128,900

12 Claims. (Cl. 260—233.3)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty therein.

This invention relates to the esterification of amylaceous polysaccharides, and more particularly, to the preparation of organic esters of polysaccharide material such as starches, modified starches or dextrins involving an activation treatment of the polysaccharide material prior to esterification.

Among the objects of this invention is the provision of a pretreatment process for such polysaccharide material as aforementioned whereby subsequent esterification can be effected without the necessity for employing gelatinizing agents or strong reagents, such as mineral acids, peracids, oxidizing agents and the like which tend to degrade the starch during acylation. Another object is to prepare an acylated starch by reaction between a starch activated according to the process described below and the organic acylating agent, such as anhydrides, acids, acyl halides, and the like. Still another object is to prepare a solid, free-flowing starch organic ester in powder form possessing the original structure of the natural starch granules; said esters possessing distinctive and advantageous physical properties. Other objects of this invention will be apparent from the following specification.

Organic esters of amylaceous polysaccharides are widely known. These polysaccharides are normally resistant to esterification, nevertheless, and heretofore it has been necessary to resort to relatively drastic reaction conditions to produce completely esterified products or to achieve practical reaction rates. This has been found particularly true of unmodified natural starch, such as the common article of commerce. Prior workers have found it necessary to employ acylating conditions which involve disruption or gelatinization of the natural starch granule. If the starch is not first gelatinized, such drastic acylation conditions are required that considerable breakdown or degradation of the starch molecule is encountered resulting in undesirable effects on the properties of the product, such as undesirable solubility characteristics and film-forming characteristics. Moreover, esters for many fundamental physico-chemical purposes are desired in undegraded form.

In accordance with my invention I have discovered that amylaceous polysaccharides such as natural starch granules, modified starches, or dextrins may be activated by heating with certain organic bases. The polysaccharides thus activated may be converted to partial organic esters, to mixed organic esters or to their organic triesters rapidly and efficiently. Moreover, according to my invention it is possible to convert natural starch granules to their triesters without disrupting the granules, so that the product is in substantially the same physical form as the original granule. This is accomplished by first activating the granules according to my process, and subsequently observing the precautions during the esterification as described below.

By the term "natural starch granule" I refer to the particle in which starch occurs naturally and do not mean merely a solid which has been comminuted or otherwise formed into discrete particles. The term "granules" as used hereinafter refers to these natural starch granules.

The action of hot organic bases upon starch has previously been believed to leave the starch in a non-reactive form. Prior workers evidently believed it was first necessary to gelatinize and disrupt the granules before efficient acylation could be accomplished.

Contrary to these beliefs of prior workers, I have discovered that amylaceous polysaccharides such as raw starches, for example, corn, sorghum, potato, wheat, sweet potato, arrowroot, rice, tapioca, canna, waxy maize, dasheen, and the like, soluble starches, horny starches and pyrodextrins, may be activated for organic esterification by heating with certain tertiary organic bases for 15 minutes to 1 hour at a temperature of 100° C. or higher up to about 150° C. The polysaccharide activated by my process may be esterified by a comparatively simple process. For example, raw starch, activated as described, may be esterified at a rate comparable to that obtainable with gelatinized corn starch.

A distinct advantage of my invention lies in the fact that it is unnecessary to gelatinize starch, thus not only simplifying the process but obviating removal of gelatinizing agents and furthermore reducing considerably the time involved in the overall operation. For example, an organic esterification agent, such as acetic anhydride, is added to the activated material and the mixture heated to a temperature in the range of 60° C. to 150° C. until the desired degree of esterification has taken place. The ester is then isolated and washed free of excess reagents in known manner, such as adding water or alcohol to the reaction mixture and filtering.

The tertiary organic base employed for the activation is pyridine or one of the picolines. Of these, pyridine is preferred because of its ready availability, reduced cost, and facilitated recovery due to its characteristic boiling range.

The presence or absence of nominal amounts of moisture, say up to about 15 percent, does not affect the activation. Nevertheless, the subsequent esterification is preferably carried out upon the dry activated material in order to avoid losses of the esterifying agent by reaction with moisture. Drying may be accomplished by known methods, such as heating in a drying atmosphere, but is quite conveniently effected in my process by distilling the requisite amount of tertiary organic base-azeotrope from the mixture during activation. The esterification can then be carried out directly and conveniently by adding the esterifying reagent to the mixture of dry activated starch and tertiary organic base.

The exact mechanism of the activation is not known at present. The activation is conveniently carried out at atmospheric pressure, but super-atmospheric pressures may be employed to permit use of temperatures higher than the normal reflux temperature of the bases. The effect on the material to be activated seems to be manifested only in the increased ease with which the esterification can be carried out. In my copending application Serial No. 83,532, filed March 25, 1949, now Patent No. 2,575,352, I have described a similar treatment of amylaceous substances in the preparation of phosphates. The process described in this copending application is considerably milder in effect and is not generally suitable for the preparation of esters of the organic acids for that reason.

If it is desired to obtain esterified starch in the form of undisrupted granules, this may be accomplished by carrying out the esterification in the presence of a diluent in which the ester is insoluble. Suitable diluents for this purpose are ethers or aliphatic hydrocarbons. The product may be isolated from the reaction mixture directly by filtration and washing.

Partial esters, that is, products not completely esterified, may be made from my activated polysaccharide material, granules, or in other form, by employing suitable amounts of esterifying agent, sufficient for the desired degree of esterification, or alternatively, by varying the time and temperature relationships for the esterification reaction; or by a combination of such methods. Mixed esters, that is, esters containing two or more kinds of organic acyl groups, may also be made by employing a suitable mixture of acylating agents, or by a partial acylation followed by a subsequent acylation with a different acylating agent.

Starch ester granules prepared in accordance with my invention have a wide variety of uses. They are free-flowing powders and, consequently are easy to handle. They may be used as dusting powders, molding powders, inert solid diluents, extenders, and the like. They may also be used for the same purposes as known forms of starch esters, such as plastic materials, films, and the like.

The following specific examples illustrate the invention. Parts are by weight unless otherwise specified.

Example I

Commercial corn starch (25 g.), containing 12.4 percent moisture, was heated in refluxing pyridine (250 cc.) for one hour. The mixture was cooled slightly, 66 cc. of acetic anhydride added and the mixture stirred and heated at 100° C. The granules gradually dissolved in the medium as they were converted to the acetate, and the mixture became viscous. In one hour's time, the mixture was no longer opaque, but was a transparent gel. After heating for another hour the product was precipitated by mixing the contents of the vessel with about 5 volumes of ethyl alcohol with vigorous agitation. After filtering, washing, and drying, 39.0 g. of product containing the theoretical amount of acetyl for starch triacetate, and containing 2.45 percent moisture was obtained.

Example II

Commercial corn starch (25 g.) containing 10.7 percent moisture, was mixed with 300 cc. pyridine and the mixture heated until 50 cc. of distillate had been collected, the time of pretreatment being fifty-five minutes. Acetic anhydride (50 cc.) was added and the mixture stirred and heated at 100° C. for two hours. The product was isolated as in Example I. It was starch triacetate in substantially quantitative yield.

Example III

Commercial corn starch (25 g.) was thoroughly dried in a vacuum oven at 100° C. It was then treated as in Example I, except that only 50 cc. acetic anhydride was used. Starch triacetate was obtained in a yield corresponding to 98.2 percent of theory, corrected for 2.5 percent moisture.

Example IV

Commercial corn starch (20 g.) was dried in a vacuum oven at 100° C. Pyridine (40 cc.) was added and the mixture was refluxed for one hour. Diamyl ether (150 cc.) and 40 cc. of acetic anhydride were added and the mixture stirred and heated at 100° C. for 22 hours. The acetylated granules were filtered and washed with ethyl alcohol and water. After drying, 30.3 g. of product containing 2 percent moisture and 44.7 percent acetyl was obtained. This compares with the theoretical 44.8 percent acetyl for starch triacetate.

Example V

Commercial corn starch (100 g.) was dried in a vacuum oven, then treated with refluxing pyridine (200 cc.) for one hour. Heptane (800 cc.) and 200 cc. of acetic anhydride were added and the mixture refluxed at 96–97° C. for 3 hours. The mixture was cooled and filtered. The acetylated granules were washed with ethanol and water and air dried. The product, a partial acetate of starch, contained 4.5 percent moisture and 32 percent acetyl. It did not gelatinize in hot water and was stable to conditions ordinarily used for wet sterilization, i. e., 15 pounds steam pressure for 20 minutes.

Example VI

Commercial corn starch (20 g.) was mixed with pyridine (100 cc.) and heated until 15 cc. distillate had been collected. The pressure was reduced from atmospheric, and 45 cc. additional distillate removed. Diamyl ether (140 cc.) was added and the mixture brought to 100° C. Acetic anhydride (20 cc.) was then added and the mixture held at 100° C. for 15 minutes. The mixture was cooled, and the acetylated granules were filtered and washed with ethanol. The product differed only very slightly in microscopic appearance from the original starch, even showing the typical anisotropy. It gelled in hot water, but did not stain blue with a trace of iodine. The moisture content after standing in the laboratory air was 10.8 percent and the acetyl content 12.7 percent.

Example VII

Commercial corn starch (20 g.) was heated with pyridine (100 cc.) and 60 cc. distillate was removed. Heptane (150 cc.) and 71 cc. of butyric anhydride were added. The mixture was heated at 100° C. for 3 hours. The esterified granules were isolated as in the preceding examples. Their appearance microscopically was quite similar to that of corn starch. The butyryl content was 18.7 percent.

Example VIII

Tapioca starch (10 g.) was dried in a vacuum oven and then treated with refluxing pyridine for one hour. Heptane (80 cc.) and 20 cc. of acetic anhydride were added and the mixture stirred and heated at reflux for 6 hours. The acetylated tapioca starch granules were isolated as in the preceding examples. They contained 34.1 percent acetyl, corrected for 3.1 percent moisture.

Example IX

Waxy maize starch (10 g.) was treated in the same manner as the tapioca starch of Example VIII. The product contained 44.1 percent acetyl, corrected for 1.3 percent moisture.

Example X

Commercial corn starch (10 g.) was dried in an oven and then heated with gamma-picoline (20 cc.) at 115° C. for 1 hour. To the slightly cooled mixture was added acetic anhydride (20 cc.) and heptane (80 cc.). The mixture was refluxed for 6 hours. The product, isolated as in the preceding examples, contained 13.8 percent acetyl.

Example XI

Commercial corn starch was treated as in Example X except that the activating agent was alpha-picoline. The product contained 5.3 percent acetyl.

I claim:

1. The method which comprises heating natural starch granules in the presence of an activating agent essentially consisting of a member of the group consisting of pyridine and picoline at 100° C. to 150° C. for fifteen minutes to one hour, not more than 15% water being present throughout the heating, to prevent gelatinization, any water initially present being boiled off during the heating, and recovering the activated polysaccharide.

2. The method which comprises heating an amylaceous polysaccharide in the presence of an activating agent essentially consisting of a member of the group consisting of pyridine and picoline at about 100° C. to 150° C. for fifteen minutes to one hour, not more than 15% water being present substantially throughout the heating, to prevent gelatinization, any water present being boiled off, adding an organic carboxylic esterifying agent to the mixture of activated polysaccharide and activating agent and heating the mixture until an ester of the amylaceous polysaccharide is formed.

3. The method which comprises activating natural starch by heating starch granules in the presence of an activating agent of the group consisting of pyridine and picoline at a temperature of 100° C. to 150° C. for fifteen minutes to one hour, not more than 15% water being present throughout the heating, to prevent gelatinization, any water initially present being boiled off during the heating, adding an organic carboxylic esterifying agent and a diluent in which the corresponding starch ester is insoluble to the resulting mixture of activated starch and activating agent and heating the mixture until the starch ester is formed.

4. The method of claim 2 in which the esterifying agent is acetic anhydride.

5. The method of claim 2 in which the esterifying agent is an anhydride of a lower fatty acid.

6. The method of claim 2 in which the esterifying agent is butyric anhydride.

7. The method which comprises activating starch by heating starch granules in an activating agent essentially consisting of a tertiary amine of the group consisting of pyridine and picoline at 100° to 150° C. for 15 minutes to one hour, water sufficient to cause gelatinization being absent, not more than 15% water being present substantially throughout the said heating distilling off tertiary amine-water azeotrope to dry the activated starch, and reacting acetic anhydride with the mixture of dry activated starch and tertiary amine to form the starch acetate.

8. A process comprising mixing natural starch granules with an activating agent essentially consisting of a member of the group consisting of pyridine and picoline, not more than 15% water being present in the mixture and throughout the subsequent heating to prevent gelatinization during the process, and heating said mixture at 100° to 150° C. for fifteen minutes to one hour, whereby the starch is activated and any water present boiled off, adding acetic anhydride to the mixture of starch and pyridine and heating to esterify the starch.

9. The process of claim 8 in which the esterification is in the presence of an aliphatic hydrocarbon diluent in which the ester is insoluble.

10. The process of claim 8 in which the esterification is in the presence of an ether diluent in which the ester is insoluble.

11. A process comprising mixing natural starch granules with an activating agent essentially consisting of a member of the group consisting of pyridine and picoline, not more than 15% water being present in the mixture and throughout the subsequent heating, to prevent gelatinization during the process, and heating the mixture to 100° to 150° for a sufficient time to activate the starch toward esterification and to boil off any water present, adding butyric anhydride and heptane and heating to esterify the starch.

12. The method which comprises activating corn starch by heating natural corn starch granules in pyridine at 100° C. for fifteen minutes to one hour, not more than 15% water being present throughout the heating, to prevent gelatinization, and recovering the activated corn starch granules.

ROLLAND L. LOHMAR, Jr.

REFERENCES CITED

The following references are of record in the file of this patent:

UNITED STATES PATENTS

| Number | Name | Date |
| --- | --- | --- |
| 1,651,366 | Berthon | Dec. 6, 1927 |
| 2,372,337 | Pascu et al. | Mar. 27, 1945 |
| 2,429,644 | Pratt | Oct. 28, 1947 |

OTHER REFERENCES

Friese et al.: Ber. 61 (1928), p. 1975–1982, 8 pgs.

Mullen et al.: Ind. Eng. Chem. 34 (1942), p. 807–812, 6 pages.